United States Patent Office 2,769,851
Patented Nov. 6, 1956

2,769,851

SELECTIVE CLATHRATION OF C8 AROMATIC HYDROCARBON MIXTURES WITH A PARA-AMINO SUBSTITUTED TRIPHENYLMETHANE

William D. Schaeffer, Berkeley, Calif., assignor to Union Oil Company of California, Los Angeles, Calif., a corporation of California No Drawing. Application February 18, 1955, Serial No. 489,276

7 Claims. (Cl. 260—674)

This invention relates to methods for resolving or purifying mixtures of aromatic hydrocarbons, the components of which differ in molecular configuration. It relates particularly to methods for resolving mixtures of the C–8 aromatic hydrocarbon isomers, and is especially desirable for purifying mixtures which are predominantly para-xylene, and wherein the major impurity consists of meta-xylene and/or ortho-xylene.

The method consists in contacting the impure hydrocarbons with a solid complexing agent, whereby one component of the mixture is selectively absorbed by the complexing agent, forming a solid complex, and leaving a liquid raffinate which is enriched in a less readily absorbable hydrocarbon. The complexing agents employed consist of certain substituted triphenylmethane compounds containing one or more amino group(s) in para-position(s), and wherein any remaining para-positions are occupied by hydrogen, amino, or hydroxyl groups. The contacting is preferably carried out by first forming a solution of the complexing agent in the hydrocarbons to be separated, and then crystallizing the complexing agent therefrom as by cooling, or adding a precipitant.

A principal object of the invention is to provide an economical method for separating aromatic hydrocarbons which are similar in chemical and physical properties, but differ primarily only in molecular configuration. A further object is to provide economical methods for the difficult separation of xylene isomers. A more specific object is to provide a method for removing meta-xylene and ortho-xylene from a crude para-xylene concentrate. Other objects will be apparent from the description which follows.

Previously known methods for separating pure para-xylene from mixtures thereof with the other C–8 aromatic isomers generally result in the economical attaining of a para-xylene concentrate containing from 70–90% para-xylene. This may readily be accomplished for example by fractional crystallization. However, the further resolution of such para-xylene concentrates is increasingly difficult, and each increment in purity is obtained only at considerable added expense. This is especially true in the case of fractional crystallization. By the present methods, such para-xylene concentrates may be economically treated with the selective complexing agents, whereby the remaining meta-xylene and ortho-xylene are selectively absorbed from the mixture. The selectively absorbed xylenes are then separated as the solid complex, and the complex may be treated as by heating, solvent extraction, steam stripping, vapor stripping, chemical decomposition, etc., in order to separate the complexing agent from the absorbed xylenes. The recovered complexing agent is then recycled to the process for further complexing of ortho- and meta-xylene. By these methods, mixtures containing for example 85% para-xylene and 15% meta- and ortho-xylenes may be treated in a single absorption stage to produce a raffinate containing 90–95% para-xylene. If greater purity is desired, the raffinate may be subjected to repeated selective complexing, until p-xylene of 97–100% purity is obtained.

The selectivity of the complexing agents is apparent when it is considered that the complexed xylenes generally contain a ratio of meta-xylene to para-xylene which is between about 2 and 10 times the ratio of meta- to para-xylene in the feed mixture. Ortho-xylene is also strongly complexed in preference to para-xylene. Ethylbenzene is apparently complexed only to a small degree, and hence it is preferable to employ ethylbenzene-free feed mixtures in order to prevent the concentration of ethylbenzene in the para-xylene raffinate.

As indicated above, the complexing step may be carried out by crystallizing the complexing agent in intimate contact with the hydrocarbons to be separated, either in the presence or absence of an extraneous solvent. Suitable solvents for the complexing step include for example paraffins, naphthenes, less readily absorbable aromatic hydrocarbons, glycols, lower alkanols, glycol mono-ethers, aliphatic ethers, ketones and the like. The complexing may also be accomplished by simply agitating or grinding the preformed complexing agent with the hydrocarbons, with or without an added thinner or solvent. In order to provide maximum combining capacity of the complexing agent for the hydrocarbon, it is preferred to carry out the complexing step at a low temperature e. g. —20° to +50° C. Higher or lower temperatures may be employed however. The amount of complexing agent employed may vary widely, for example between about 0.5 and 10 moles thereof per mole of total absorbable compound(s). It is found in the case of xylenes that the saturated complex generally contains about 0.5 mole of total xylenes per mole of complexing agent. Separation of the solid complex from the liquid raffinate is accomplished by any conventional method such as filtration or centrifuging.

It is preferable to wash the solid complex with an inert solvent if it is desired to recover the absorbed hydrocarbon in relatively pure form. Suitable solvents for such purposes include paraffinic hydrocarbons such as n-heptane, chlorinated hydrocarbons, naphthenes e. g. cyclohexane, and the like.

The preferred complexing agents employed herein may be designated by the following general formula:

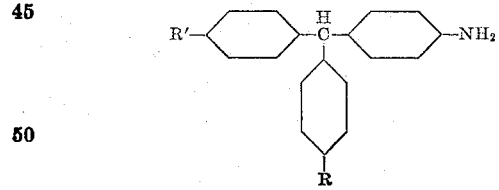

wherein R and R' are selected from the group consisting of —H, —NH2, and —OH. Specific results obtainable in using such complexes are illustrated by the following examples. These examples should not however be construed as limiting in scope.

Example I

To a 150 ml. beaker was added 21 grams of purified 4,4'-diamino triphenylmethane and 50 ml. of mixed xylenes of the composition shown in Table 1. The mixture was heated on a hot plate until complete solution of the diamino triphenylmethane was effected in the xylene mixture (100° C.). The hot clear solution was allowed to cool and crystals began to separate at 85° C., and separation by filtration was carried out at 30° C. The solid on the filter was air dried and then subjected to steam distillation in 200 ml. of 15% hydrochloric acid, which removed the hydrocarbon content of the solid phase as a water azeotrope. The hydrocarbon recovered from the complex was composed as shown in Table 1. (All analyses are by ultraviolet absorption spectrometry):

TABLE 1

| Sample | Percent by volume | | | |
|---|---|---|---|---|
|  | p-xylene | m-xylene | o-xylene | Et. Bz. |
| Feed | 19.2 | 49.5 | 16.5 | 14.8 |
| Complexed hydrocarbons | 13.7 | 53.5 | 24.3 | 8.5 |

From the above data it is obvious that 4,4'-diamino triphenylmethane can function as a selective complexing agent for removing meta- and ortho-xylenes from a mixture of the C-8 aromatic isomers containing para-xylene. The mole-ratio of meta-xylene/para-xylene in the feed mixture was 2.58, while the ratio in the complexed hydrocarbons was 3.9.

*Example II*

To a 150 ml. beaker was added 30 grams of 4-hydroxy-4',4''-diamino triphenylmethane and 30 ml. of methyl Cellosolve. This mixture was heated to solution (90° C.) and 30 ml. of mixed xylenes of the composition shown in Table 1 was added. The solution was cooled to 25° C. and the precipitated solid was removed by filtration. The solid was washed once by agitating with 30 ml. of n-heptane, then refiltered. The washed solid was decomposed in aqueous hydrochloric acid to liberate the hydrocarbon phase, which was extracted from the aqueous phase with 15 ml. of n-heptane. The xylenes recovered in the heptane extract were then subjected to analysis with the following results:

TABLE 2

| Sample | Percent by volume | | | |
|---|---|---|---|---|
|  | p-xylene | m-xylene | o-xylene | Et. Bz. |
| Feed | 23.2 | 45.8 | 20.1 | 10.9 |
| Complexed hydrocarbons | 10.5 | 56.6 | 28.7 | 5.1 |

In this example the ratio of m-xylene/p-xylene in the feed mixture was 1.96, while the corresponding ratio in the complexed hydrocarbon phase was 5.4. It is clear therefore that this complexing agent shows strong preference for meta-xylene relative to para-xylene. The ratio of o-xylene/p-xylene in the feed mixture was 0.87, while the corresponding ratio in the complexed hydrocarbons was 2.7, showing that there is also a strong preference for ortho-xylene.

The other para-amino substituted triphenylmethanes are found to exhibit similar selective clathrating properties when employed in the above examples. Other complexing procedures show comparable resolutions. Similarly, when other aromatic hydrocarbon mixtures are substituted for the xylenes, it is found that one of such hydrocarbons is complexed in preference to another. Examples of such other mixtures include alpha- and beta-methylnaphthalene mixtures, isomeric cymene mixtures, isomeric trimethyl benzene mixtures, naphthalene and diphenyl mixtures, isomeric diethyl benzene mixtures, isomeric methyl-ethyl benzene mixtures, isomeric C-9 alkyl-aromatic hydrocarbon mixtures, and many similar mixtures. The invention is directed broadly to the use of the herein described complexing agents for effecting any resolution or purification of such aromatic hydrocarbons. The invention should therefore not be considered as limited by any of the details described above; the true scope of the invention is intended to be embraced by the following claims.

I claim:

1. A process for resolving a mixture of C-8 aromatic hydrocarbons which comprises contacting said mixture with a solid complexing agent having the general formula:

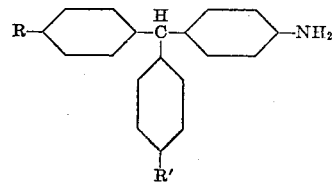

wherein R and R' are selected from the group consisting of —H, —NH₂ and —OH, whereby one hydrocarbon in said mixture is selectively absorbed in preference to another, separating a solid complex from said contacting step, and recovering a raffinate hydrocarbon phase relatively enriched in the less readily absorbable components of said mixture.

2. A process as defined in claim 1 wherein said hydrocarbon mixture is a mixture of C-8 aromatic hydrocarbons including para-xylene and meta-xylene.

3. A process as defined in claim 1 wherein said complexing agent is 4,4'-diamino triphenylmethane.

4. A process as defined in claim 1 wherein said complexing agent is 4,4'-diamino-4''-hydroxy triphenylmethane.

5. A method for purifying a para-xylene concentrate containing about 70–90% para-xylene and 10–30% meta- and ortho-xylene which comprises contacting said concentrate with a solid complexing agent having the formula:

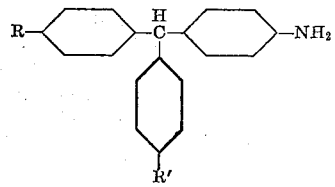

wherein R and R' are selected from the group consisting of —H, —NH₂, and —OH, whereby the ortho- and meta-xylene in said concentrate is selectively absorbed by said complexing agent, separating the resulting solid complex from the unabsorbed xylenes, said unabsorbed xylenes constituting para-xylene of greater purity than said initial concentrate.

6. A process as defined in claim 5 wherein said complexing agent is 4,4'-diamino triphenylmethane.

7. A process as defined in claim 5 wherein said complexing agent is 4,4'-diamino-4'''-hydroxy triphenylmethane.

References Cited in the file of this patent

Weil et al.: Ber. 61B, pages 1294–1307 (1928), Abstracted in Chemical Abstracts, vol. 22, columns 4117–8 (1928).